(12) United States Patent
Kishishita et al.

(10) Patent No.: US 11,560,871 B2
(45) Date of Patent: Jan. 24, 2023

(54) WAVE POWER UTILIZATION DEVICE AND CONTROL METHOD OF WAVE POWER UTILIZATION DEVICE

(71) Applicant: Panasonic Intellectual Property Management Co., Ltd., Osaka (JP)

(72) Inventors: Kensuke Kishishita, Osaka (JP); Terutsugu Segawa, Osaka (JP); Fuminori Takami, Osaka (JP); Isamu Aokura, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 17/471,148

(22) Filed: Sep. 9, 2021

(65) Prior Publication Data
US 2022/0120254 A1    Apr. 21, 2022

(30) Foreign Application Priority Data

Oct. 19, 2020 (JP) .............................. JP2020-175277

(51) Int. Cl.
*F03B 13/00* (2006.01)
*F03B 13/14* (2006.01)

(52) U.S. Cl.
CPC .................. *F03B 13/142* (2013.01)

(58) Field of Classification Search
CPC .... F03B 13/142; F03B 11/002; F03B 11/004; F03B 13/141; F03B 15/00; Y02E 10/20; Y02E 10/30
See application file for complete search history.

(56) References Cited

U.S. PATENT DOCUMENTS

| | | | | |
|---|---|---|---|---|
| 3,515,889 A | * | 6/1970 | Kammerer | F03B 13/187 290/53 |
| 4,281,257 A | * | 7/1981 | Testa | F03B 13/24 417/343 |
| 2005/0247055 A1 | * | 11/2005 | Abouraphael | F03B 17/02 60/495 |
| 2012/0251349 A1 | * | 10/2012 | Ortiz | F03B 13/142 417/330 |
| 2016/0273512 A1 | | 9/2016 | Nanehkaran | |
| 2022/0003200 A1 | * | 1/2022 | Takami | F03B 13/142 |

FOREIGN PATENT DOCUMENTS

| | | |
|---|---|---|
| JP | 61-089982 | 5/1986 |
| JP | 2013-029087 | 2/2013 |
| JP | 2015-040540 | 3/2015 |
| JP | 2016-533455 | 10/2016 |
| JP | 2019-015282 | 1/2019 |

* cited by examiner

*Primary Examiner* — Julio C. Gonzalez
(74) *Attorney, Agent, or Firm* — Wenderoth, Lind & Ponack L.L.P.

(57) ABSTRACT

A compression pipe is configured with a wave drawing section and an air compressing section, a gas-liquid introduction on-off valve is disposed in wave drawing section, a gas-liquid introduction on-off valve is opened at an initial stage of a pushing wave, the gas-liquid introduction on-off valve is closed at the same time when a wave that maintains a speed flows into a wave receiving box. Accordingly, the wave is drawn into the air compressing section, is stored in a compressed air storage tank by converting kinetic energy of the wave into compressed air, and can be utilized for power generation and the like.

7 Claims, 8 Drawing Sheets

WAVE POWER UTILIZATION DEVICE AND CONTROL METHOD OF WAVE POWER UTILIZATION DEVICE

BACKGROUND

1. Technical Field

The present disclosure relates to a wave power utilization device and a control method of a wave power utilization device for generating compressed air from the energy of waves and storing the generated compressed air in order to widely utilize the energy of the rushing waves.

2. Description of the Related Art

World energy consumption continues to increase year by year. Global warming has become a problem due to the increase in $CO_2$ emissions caused by the increase in use of fossil fuels such as oil, coal, and natural gas. Meanwhile, there is a concern that these fossil fuels will be in short supply due to depletion. Under these circumstances, the use of renewable energy is being actively promoted in the world. Among the renewable energies, the natural energies obtained from natural phenomena include solar light and heat, wind power, tidal power, wave power, and geothermal power, and are expected as clean energy resources without a concern about depletion.

Among natural energies, while power generation amount of solar power generation and wind power generation is greatly affected by external factors, wave power generation is relatively stable and area efficiency is several to several tens of times higher. Japan, which is an island country, has high potential for the utilization of ocean energy.

However, there are problems related to installation costs for installation in the ocean, corrosion due to constant contact with seawater, maintenance costs associated with ensuring long-term reliability such as regular maintenance of foreign matter such as shellfish, barnacles, and dust, and safety against abnormal weather such as typhoons.

As a system that uses the power of the rushing waves to generate electricity in the related art, there is a system that generates electricity by compressing air in a casing by an up-down movement of the waves using the casing to generate an air flow, and by rotating a turbine using the air flow (for example, refer to Japanese Patent Unexamined Publication No. 2013-29087).

FIG. 6 is a view illustrating a power generation method that utilizes wave power in the related art described in Japanese Patent Unexamined Publication No. 2013-29087. Wave energy introducer 601 is configured with casing 602 of which a lower surface is open on the water, and ventilation line 603. Buffer tank 604 is disposed at an end of ventilation line 603, and is further connected to turbine 605 and generator 606.

Waves rush to wave energy introducer 601, the seawater surface moves up and down in casing 602, and accordingly, the air in casing 602 is pushed, the pushed and compressed air passes through ventilation line 603 and is blown to turbine 605, and generator 606 generates electricity by rotating turbine 605.

SUMMARY

According to an aspect of the present disclosure, there is provided a wave power utilization device including: a wave receiving box having a wave receiving box inlet that receives push and pull of waves of seawater, and having a space filled with the seawater that flows in from the wave receiving box inlet; a hollow compression pipe connected to communicate with an inside of the wave receiving box, the hollow compression pipe having an upper opening and a lower opening which is set to have a wider flow path cross-sectional area than a flow path cross-sectional area of the upper opening, the hollow compression pipe including a tapered section, a wave drawing section and an air compression section, the tapered section connecting the lower opening and the upper opening to each other in a tapered shape, the wave drawing section drawing the waves drawn into the wave receiving box through the tapered section, the air compressing section compressing air by the drawn waves; a gas-liquid introduction on-off valve which is connected to an upper part of the wave drawing section, and performs an opening operation to allow the air or the seawater to flow in and out; an air discharge pipe connected to an upper part of the air compressing section and having a check valve that allows a flow of the air only in a downstream direction from the air compressing section; a compressed air storage tank connected to a downstream side of a flow path of the air discharge pipe, and filled with the air compressed by the air compressing section; an air introduction unit which introduces the air into the air compressing section; an air introduction pipe which connects the air introduction unit and the air compressing section to each other; and an air introduction on-off valve provided in a middle of the air introduction pipe and capable of introducing the air from the air introduction unit into the air compressing section during the opening operation.

According to another aspect of the present disclosure, there is provided a control method of a wave power utilization device, the wave power utilization device including a wave receiving box having a wave receiving box inlet that receives push and pull of waves of seawater, and having a space filled with the seawater that flows in from the wave receiving box inlet, a hollow compression pipe connected to communicate with an inside of the wave receiving box, the hollow compression pipe having an upper opening and a lower opening which is set to have a wider flow path cross-sectional area than a flow path cross-sectional area of the upper opening, the hollow compression pipe including a tapered section, a wave drawing section and an air compressing section, the tapered section connecting the lower opening and the upper opening to each other in a tapered shape, the wave drawing section drawing the waves drawn into the wave receiving box through the tapered section, the air compressing section compressing air by the drawn waves, a gas-liquid introduction on-off valve which is connected to an upper part of the wave drawing section, and performs an opening operation to allow the air or the seawater to flow in and out, an air discharge pipe connected to an upper part of the air compressing section and having a check valve that allows a flow of the air only in a downstream direction from the air compressing section, a compressed air storage tank connected to a downstream side of a flow path of the air discharge pipe, and filled with the air compressed by the air compressing section, an air introduction unit which introduces the air into the air compressing section, an air introduction pipe which connects the air introduction unit and the air compressing section to each other, and an air introduction on-off valve provided in a middle of the air introduction pipe and capable of introducing the air from the air introduction unit into the air compressing section during the opening operation, the method including: sucking the air or the seawater from an outside of the compression pipe into an inside of the hollow compression pipe, from the gas-liquid introduction on-off valve during a receding wave and flowing the waves having a speed into the wave receiving box during a pushing wave; and compressing the air by the air compressing section by closing the gas-liquid introduction on-off valve when the flowed-in waves push the air in the air compressing section.

DETAILED DESCRIPTIONS

In the configuration of the related art, the air in casing 602 is compressed to generate an air flow by utilizing the up-down movement of the seawater surface in casing 602, which is generated by the rushing waves.

However, since the internal pressure of casing 602 rises due to the up-down movement of the seawater surface, there is a problem that waves cannot be sufficiently drawn into casing 602 and the kinetic energy of the waves cannot be utilized for air compression.

The present disclosure solves the problem of the related art, and an object thereof is to provide a wave power utilization device and a control method of a wave power utilization device that can enhance the compression effect by utilizing the kinetic energy of the waves and generate compressed air.

Hereinafter, embodiments of the disclosure will be described with reference to the drawings.

Exemplary Embodiment

Figure 1:
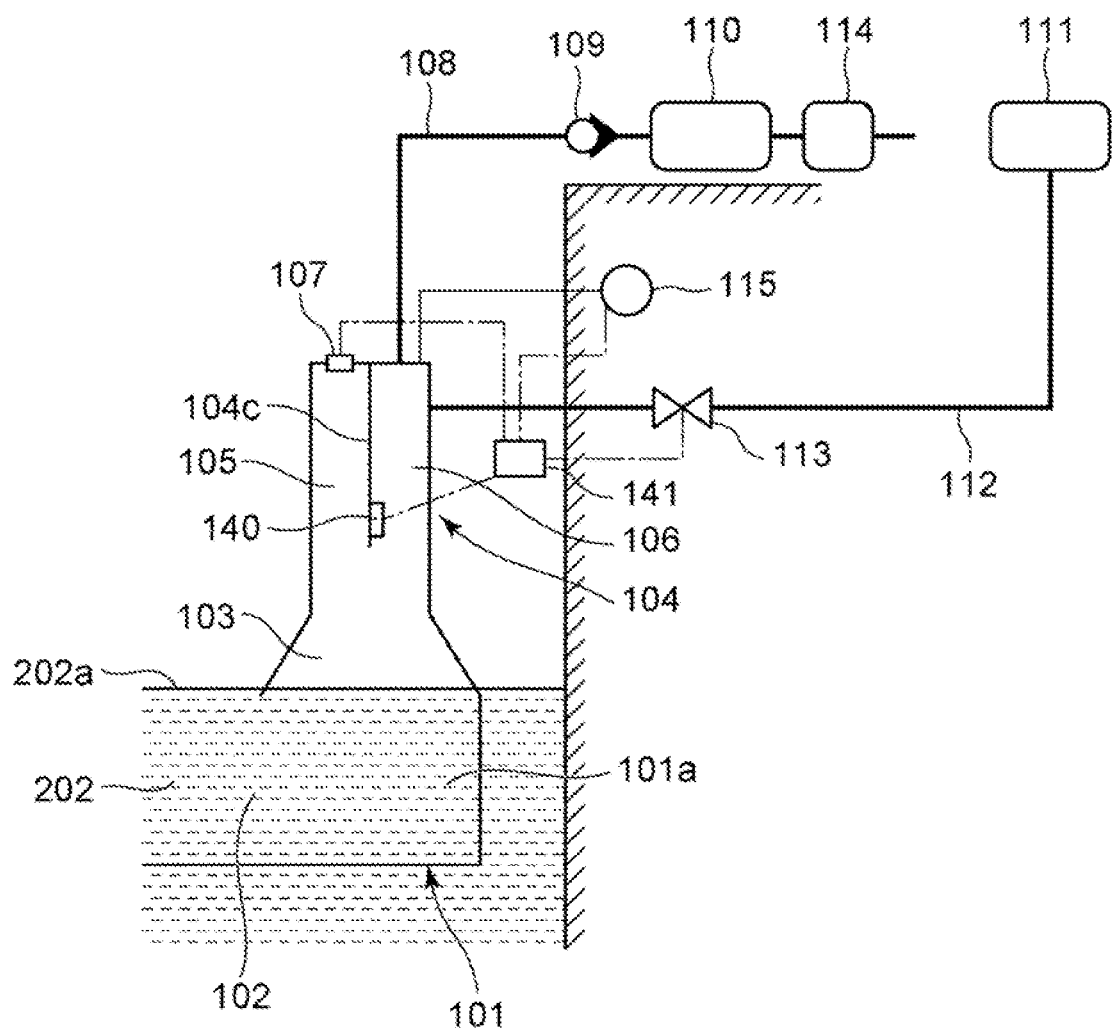
FIG. 1 illustrates a wave power utilization device according to an exemplary embodiment of the disclosure.

FIG. 1 is a view illustrating a configuration of a wave power utilization device according to an exemplary embodiment of the disclosure.

The wave power utilization device includes wave receiving box 101, tapered section 103, compression pipe 104, gas-liquid introduction on-off valve 107, air discharge pipe 108, compressed air storage tank 110, air introduction unit 111, air introduction pipe 112, air introduction on-off valve 113, and compressed air utilizer 114.

In FIG. 1, wave receiving box 101 includes wave receiving box inlet 102 that receives the push and pull of waves, and includes space 101a filled with seawater 202 that flows in from wave receiving box inlet 102. Specifically, wave receiving box 101 is installed in a place where wave 201 can be received, such as in the sea or at the beach, and includes wave receiving box inlet 102 of which at least a part of the side surface facing wave 201 is opened to receive the push and pull of wave 201. Wave receiving box 101 includes space 101a filled with seawater 202 from wave receiving box inlet 102 to the back (to the right in FIG. 1).

For example, compression pipe 104 disposed along the up-down direction communicates with and is connected to the upper part of wave receiving box 101. Compression pipe 104 is a hollow pipe, and the upper part of compression pipe 104 has wave drawing section 105 and air compressing section 106 which are separated from each other by wall 104c and adjacent to each other. Wave drawing section 105 and air compressing section 106 communicate with each other only on the lower side (for example, near the lower part or the lower part of the upper part) of compression pipe 104. The lower part following the upper part of compression pipe 104 is configured with tapered section 103 that extends downward. Tapered section 103 is set such that the flow path cross-sectional area of the upper end opening of tapered section 103 is smaller than the flow path cross-sectional area of the lower end opening of tapered section 103 connected to the upper surface of wave receiving box 101. Accordingly, tapered section 103 is configured with a pipe in a tapered shape in which the lower opening is set to have a wider flow path cross-sectional area than that of the upper opening and the lower opening and the upper opening are connected to each other.

Gas-liquid introduction on-off valve 107 that makes it possible for air or seawater to flow in and out during the opening operation is provided at, for example, the upper end of the upper part of wave drawing section 105. The opening and closing operation of gas-liquid introduction on-off valve 107 can be opened and closed by seawater or air in wave drawing section 105, as will be described later in FIGS. 4A to 4C.

Air compressing section 106 is provided with pressure detection unit 115 such as a pressure sensor for detecting the pressure in air compressing section 106. Based on the result detected by pressure detection unit 115, air introduction on-off valve 113 can be opened and closed.

Air discharge pipe 108 is connected to the upper end of the upper part of air compressing section 106. Air discharge pipe 108 is provided with check valve 109, and air flows only in the downstream direction.

Compressed air storage tank 110 is provided on the downstream side of the flow path of air discharge pipe 108, and compressed air storage tank 110 is filled with the air compressed by air compressing section 106. The compressed air stored in compressed air storage tank 110 is utilized for power generation or the like by compressed air utilizer 114 provided in the flow path on the downstream side of compressed air storage tank 110. Compressed air may be utilized as it is as compressed air in addition to power generation.

Air introduction unit 111 for introducing air into air compressing section 106 is connected to air compressing section 106. In other words, air compressing section 106 and air introduction unit 111 are connected to each other by air introduction pipe 112, and air introduction pipe 112 is provided with air introduction on-off valve 113. Air introduction unit 111 is a device for introducing air into air compressing section 106, and can be configured by a pump, a return flow path of compressed air, or the like. Air introduction on-off valve 113 is capable of introducing air into air compressing section 106 during the opening operation of air introduction on-off valve 113.

Here, although not illustrated in the drawing, the height of seawater surface 202a outside wave receiving box 101 is grasped by the seawater surface detection unit. As an example of the seawater surface detection unit, a wave height meter, a water surface sensor, a float sensor, or the like can be used.

FIGS. 2A, 2B, 2C, and 2D are views illustrating the behavior of seawater 202 when wave 201 rushes in the exemplary embodiment of the disclosure, and there is a case where the upper part of compression pipe 104 is positioned higher than seawater surface 202a. The same components as those in FIG. 1 use the same reference numerals, and the description thereof will be omitted. Here, a case where the upper part of compression pipe 104 is higher than seawater surface 202a means a case where the upper and lower ends of compression pipe 104, at which wave drawing section 105 and air compressing section 106 communicate with each other, are positioned above seawater surface 202a.

Figure 2A:
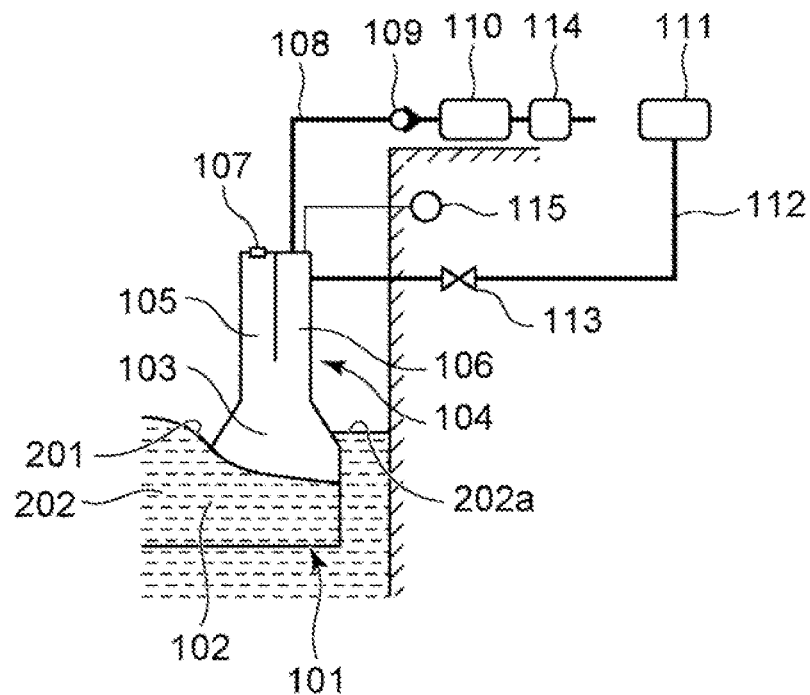
FIG. 2A illustrates a behavior of a wave during a pushing wave according to the exemplary embodiment of the disclosure.

In FIG. 2A, seawater 202 pushed by wave 201 starts to flow into wave receiving box 101 from wave receiving box inlet 102. At this time, gas-liquid introduction on-off valve 107 is open, and the pressure in compression pipe 104 is atmospheric pressure.

Figure 2B:
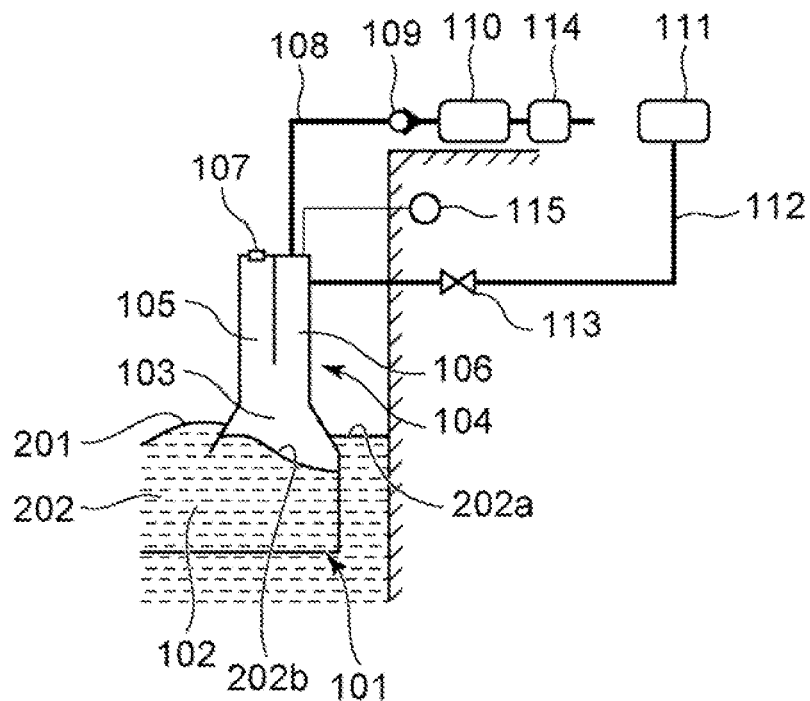
FIG. 2B illustrates a behavior of the wave during the pushing wave according to the exemplary embodiment of the disclosure.

Next, in FIG. 2B, seawater 202 pushed by wave 201 further flows into wave receiving box 101 from wave receiving box inlet 102 more than the state of FIG. 2A, and accordingly, seawater surface 202b in the wave receiving box 101 is pushed up more than the state of FIG. 2A. At this time, since gas-liquid introduction on-off valve 107 is open, the air pushed away by seawater surface 202b being pushed up is pushed out of compression pipe 104 through gas-liquid introduction on-off valve 107.

Figure 2C:
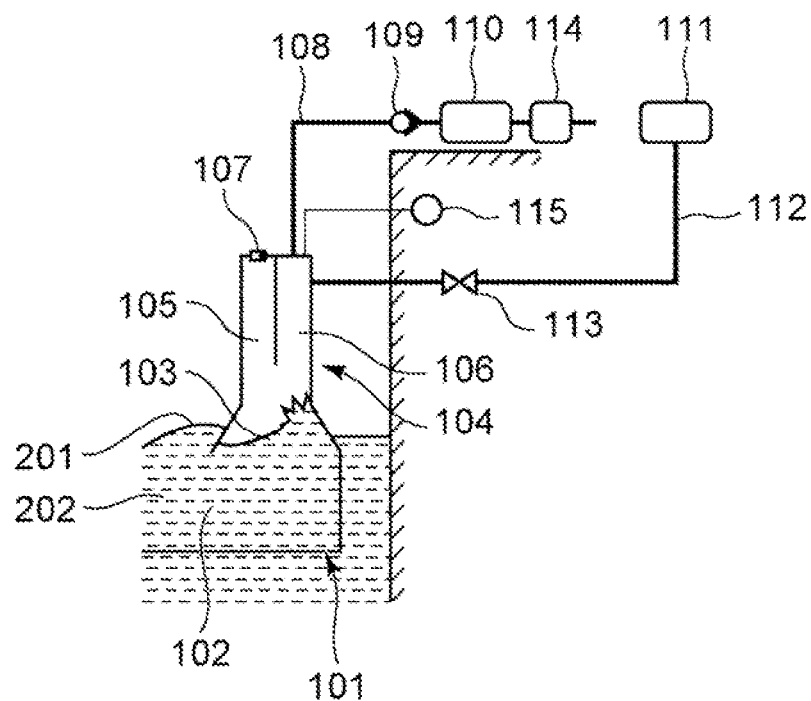
FIG. 2C illustrates a behavior of the wave during the pushing wave according to the exemplary embodiment of the disclosure.

Next, in FIG. 2C, when seawater 202 sufficiently flows into wave receiving box 101 more than the state of FIG. 2B and gas-liquid introduction on-off valve 107 is closed at the same time, seawater 202 continues to flow into wave receiving box 101 while maintaining the speed due to the inertia of wave 201, and seawater surface 202b rises to the upper part in compression pipe 104.

Figure 2D:
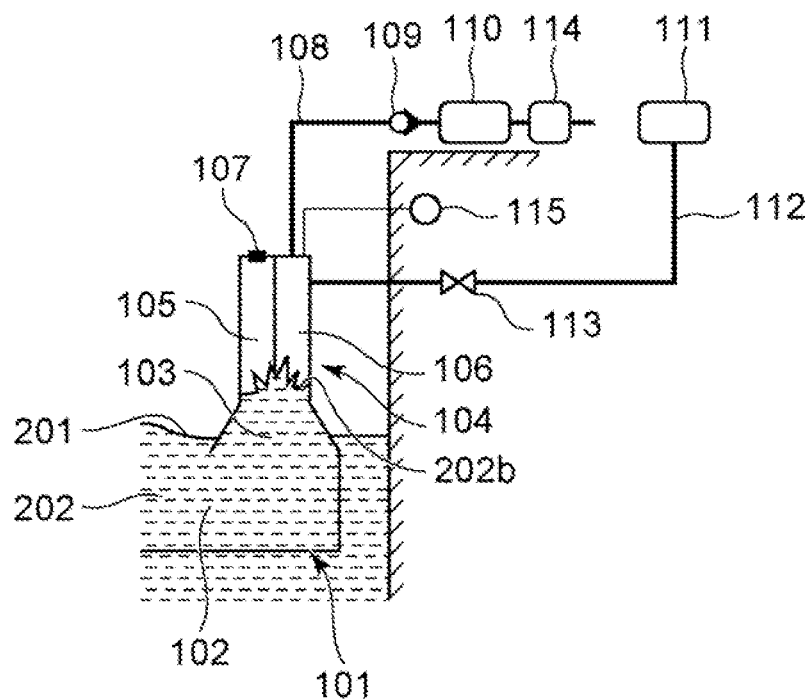
FIG. 2D illustrates a behavior of the wave during the pushing wave according to the exemplary embodiment of the disclosure.

Next, in FIG. 2D, seawater 202 that has flowed into wave receiving box 101 while maintaining the speed can compress the air by air compressing section 106 by vigorously raising seawater surface 202b in compression pipe 104. The compressed air is discharged from air compressing section 106, and fills compressed air storage tank 110 through air discharge pipe 108 and check valve 109.

By the receding wave after the pushing wave in FIGS. 2A, 2B, 2C, and 2D, seawater 202 comes out of wave receiving box 101 through wave receiving box inlet 102 due to wave 201, and seawater surface 202b pushed up by the pushing wave is pulled down. At this time, the air in compression pipe 104 expands, and the pressure inside compression pipe 104 becomes negative. At this time, by opening gas-liquid introduction on-off valve 107 again, air flows into compression pipe 104, and the pressure inside compression pipe 104 becomes atmospheric pressure.

As described above, the compressed air fills compressed air storage tank 110 by repeating the opening and closing control of gas-liquid introduction on-off valve 107 in accordance with the push and pull of wave 201.

FIGS. 3A, 3B, 3C, and 3D are views illustrating the behavior of seawater 202 when wave 201 rushes in the exemplary embodiment of the disclosure, and there is a case where compression pipe 104 is positioned lower than seawater surface due to the ebb tide. The same components as those in FIGS. 1 and 2 use the same reference numerals, and the description thereof will be omitted.

Figure 3A:
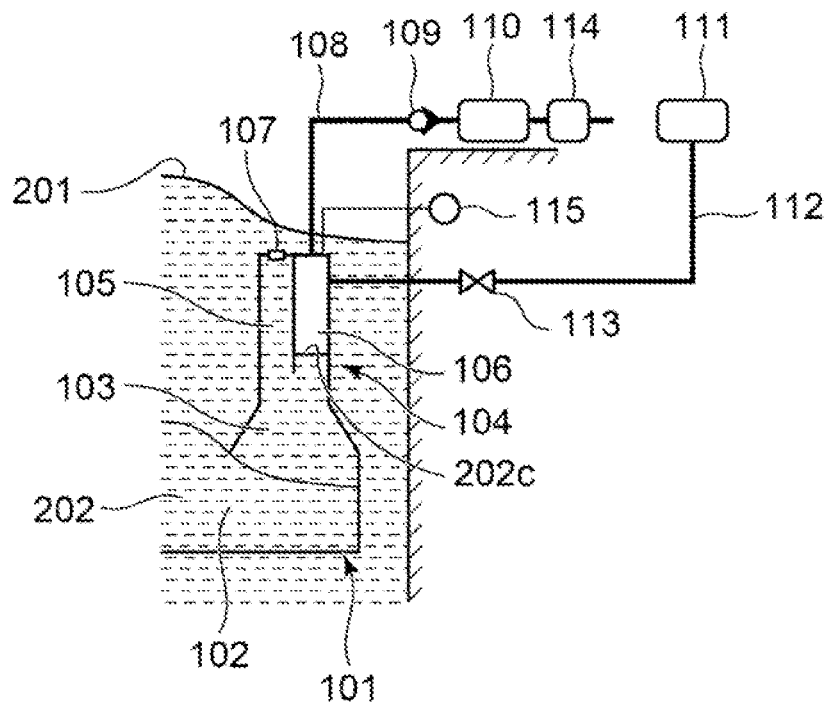
FIG. 3A illustrates a behavior of the wave during the pushing wave according to the exemplary embodiment of the disclosure.

In FIG. 3A, seawater 202 pushed by wave 201 starts to flow into wave receiving box 101 from wave receiving box inlet 102.

Figure 3B:
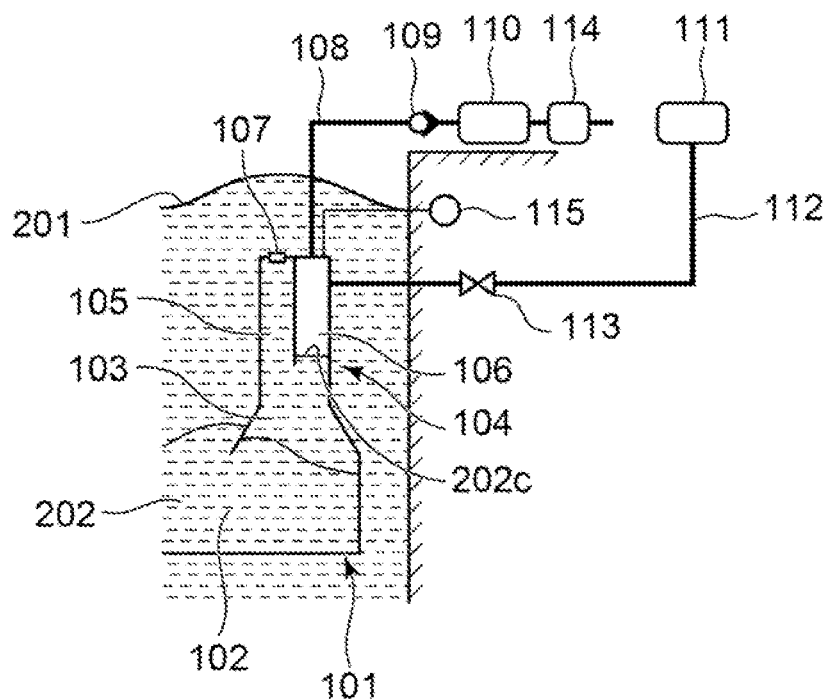
FIG. 3B illustrates a behavior of the wave during the pushing wave according to the exemplary embodiment of the disclosure.

Next, in FIG. 3B, seawater 202 pushed by wave 201 further flows into wave receiving box 101 from wave receiving box inlet 102 more than the state of FIG. 3A, and accordingly, seawater surface is pushed up more than the state of FIG. 3A. At this time, since gas-liquid introduction on-off valve 107 is open, the seawater in wave drawing section 105 pushed away by seawater 202 flowing into wave receiving box 101 from wave receiving box inlet 102 is pushed out of compression pipe 104 through gas-liquid introduction on-off valve 107.

Figure 3C:
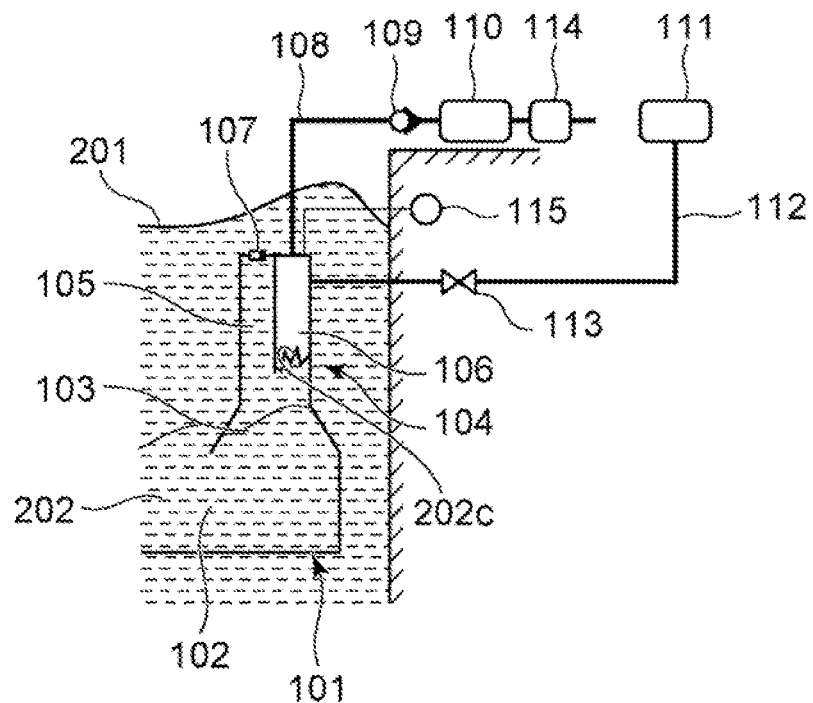
FIG. 3C illustrates a behavior of the wave during the pushing wave according to the exemplary embodiment of the disclosure.

Next, in FIG. 3C, when seawater 202 sufficiently flows into wave receiving box 101 more than the state of FIG. 3B and gas-liquid introduction on-off valve 107 is closed at the same time, seawater 202 continues to flow into wave receiving box 101 while maintaining the speed due to the inertia of wave 201, and seawater surface 202c rises in air compressing section 106.

Figure 3D:
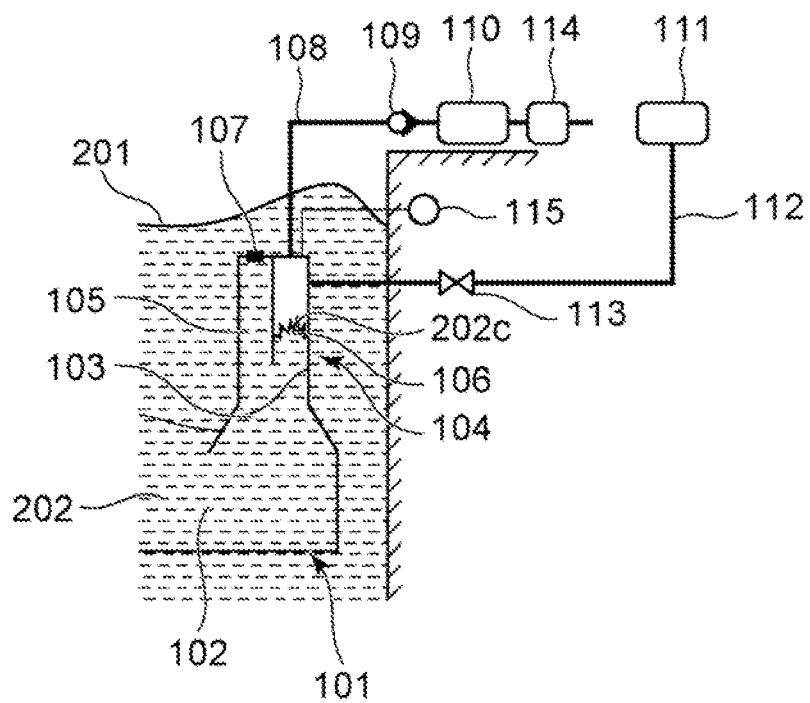
FIG. 3D illustrates a behavior of the wave during the pushing wave according to the exemplary embodiment of the disclosure.

Next, in FIG. 3D, seawater 202 that has flowed into wave receiving box 101 while maintaining the speed can compress the air by air compressing section 106 by vigorously raising seawater surface 202c in air compressing section 106. The compressed air is discharged from air compressing section 106, and fills compressed air storage tank 110 through air discharge pipe 108 and check valve 109.

By the receding wave after the pushing wave in FIGS. 3A, 3B, 3C, and 3D, seawater 202 comes out of wave receiving box 101 through wave receiving box inlet 102 due to wave 201, and seawater surface 202c in air compressing section 106 pushed up by the pushing wave is pulled down. At this time, the air in air compressing section 106 expands, and the pressure inside air compressing section 106 becomes negative. At this time, air introduction on-off valve 113 is controlled by the pressure detected by pressure detection unit 115, air is introduced into air compressing section 106 from air introduction unit 111 through air introduction pipe 112, and accordingly, seawater surface 202c inside air compressing section 106 is pushed down. For example, when the pressure detected by pressure detection unit 115 is lower than a predetermined pressure, air introduction on-off valve 113 is opened to introduce air from air introduction unit 111 into air compressing section 106 through air introduction pipe 112. At this time, gas-liquid introduction on-off valve 107 is opened again. The opening and closing operation of air introduction on-off valve 113 and/or gas-liquid introduction on-off valve 107 may be controlled by controller 141.

In this state, by receiving the pushing wave in FIGS. 3A, 3B, 3C, and 3D, the air in air compressing section 106 is converted into compressed air again and stored in compressed air storage tank 110 to be utilized for power generation and the like.

In other words, according to the configuration, compression pipe 104 is configured with wave drawing section 105 and air compressing section 106, gas-liquid introduction on-off valve 107 is disposed in wave drawing section 105, gas-liquid introduction on-off valve 107 is opened at the initial stage of the pushing wave, and then, gas-liquid introduction on-off valve 107 is closed when wave 201 that maintains the speed flows into wave receiving box 101. Accordingly, wave 201 is drawn into air compressing section 106, is stored in compressed air storage tank 110 by converting the kinetic energy of wave 201 into the compressed air, and can be utilized for power generation and the like.

In the exemplary embodiment, the introduction of air by air introduction unit 111 can be determined by controller 141 based on the detection result of pressure detection unit 115, but water level detection unit 140 such as a water level detection sensor may be installed in air compressing section 106, and the introduction of air may be determined by controller 141 by detecting the water level of seawater surface 202c by water level detection unit 140.

Figure 4A:
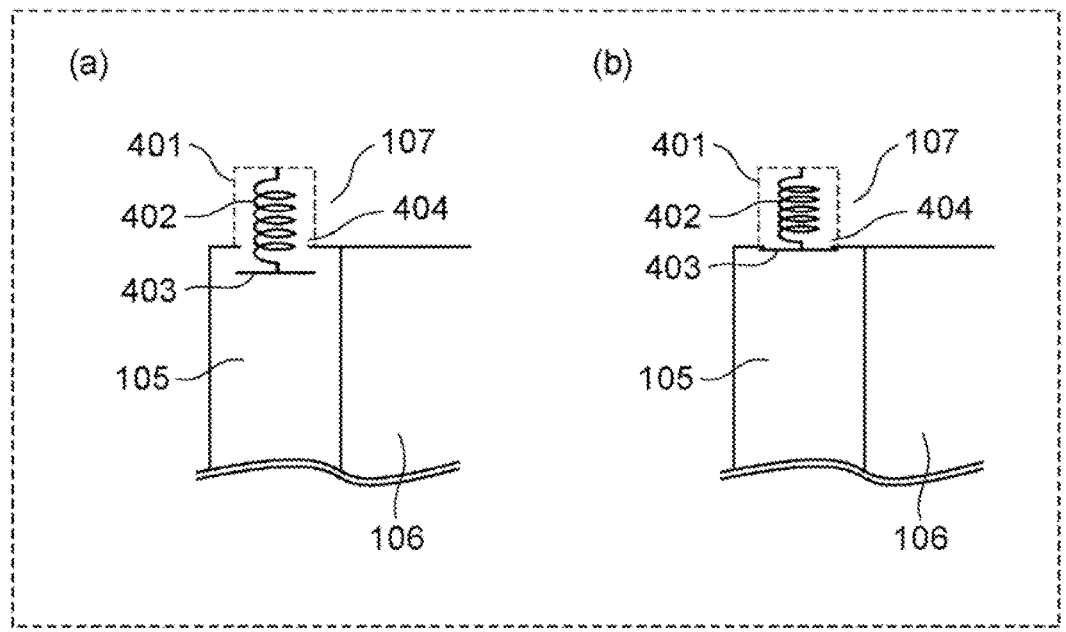
FIG. 4A illustrates a configuration of a gas-liquid introduction on-off valve during a receding wave and a pushing wave according to the exemplary embodiment of the disclosure.
Figure 4B:
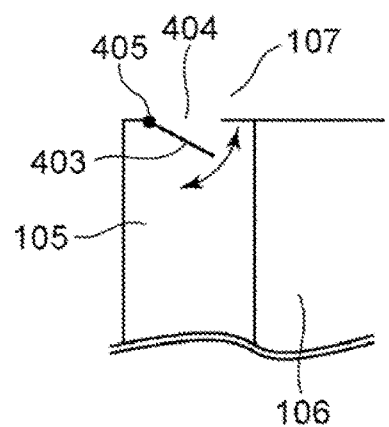
FIG. 4B illustrates a configuration of the gas-liquid introduction on-off valve according to the exemplary embodiment of the disclosure.
Figure 4C:
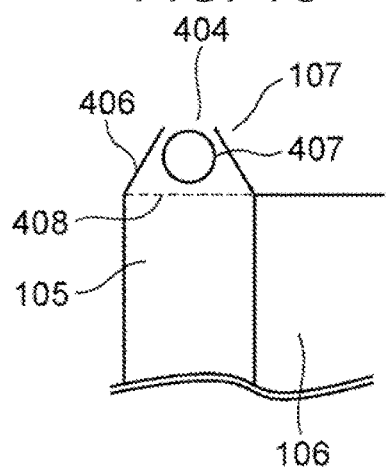
FIG. 4C illustrates a configuration of the gas-liquid introduction on-off valve according to the exemplary embodiment of the disclosure.

FIGS. 4A, 4B, and 4C are views illustrating a configuration example of gas-liquid introduction on-off valve 107 of the wave power utilization device according to an exemplary embodiment of the disclosure. (a) of FIG. 4A illustrates a configuration of the gas-liquid introduction on-off valve during the receding wave according to the exemplary embodiment of the disclosure, and (b) of FIG. 4A illustrates a configuration of the gas-liquid introduction on-off valve during the pushing wave according to the exemplary embodiment of the disclosure.

In (a) of FIG. 4A, gas-liquid introduction on-off valve 107 has spring 402 provided with plate 403 that can be closed by plugging at the lower end thereof, and fixer 401 that fixes the upper end of spring 402 to wave drawing section 105, at opening part 404 configured with an opening disposed above wave drawing section 105. Plate 403 functions as a valve body.

During the receding wave, spring 402 extends downward due to the weight of plate 403, and opening part 404 is open, and air or seawater can flow in and out inside and outside the wave drawing section 105. During the pushing wave, the seawater that flows into wave receiving box 101 pushes the air or seawater in wave drawing section 105, and an upward air flow or seawater flow is generated. Due to the generated air or seawater flow, plate 403 receives an upward force, spring 402 contracts as illustrated in (b) of FIG. 4A, opening part 404 is completely plugged and closed by plate 403, and accordingly, the air is compressed in air compressing section 106. At this time, by using plate 403 of which specific gravity is larger than that of seawater 202, plate 403 descends by the own weight even in the sea, and opening part 404 can be opened during the receding wave.

As another example of gas-liquid introduction on-off valve 107, as illustrated in FIG. 4B, plate 403 may be fixed to rotating fixer 405, and opening part 404 may be opened and closed by the rotational movement of plate 403. Plate 403 functions as a valve body.

Otherwise, as yet another example of gas-liquid introduction on-off valve 107, as illustrated in FIG. 4C, opening part 404 may be opened and closed by configuring a part between the upper surface of wave drawing section 105 and opening part 404 with orifice stopper 406 having a narrowing tapered shape, and by installing spherical plug 407 having a diameter larger than the diameter of opening part 404 and smaller than the diameter of the wave drawing section inside thereof. Spherical plug 407 functions as a valve body, and is held above wave drawing section 105 such that the seawater or air does not drop due to, for example, net-like holder 408 through which the seawater or air can pass.

When gas-liquid introduction on-off valve 107 has a mechanism in which wave drawing section 105 is sealed by the air or seawater flow during the pushing wave and wave drawing section 105 is opened during the receding wave, gas-liquid introduction on-off valve 107 is not limited to the configuration illustrated in FIGS. 4A, 4B, and 4C.

For example, the opening and closing of gas-liquid introduction on-off valve 107 may be electronically controlled by installing pressure detection unit 115 or water level detection unit 140 in air compressing section 106, and by detecting the pressure or the water level inside air compressing section 106.

Figure 5A:
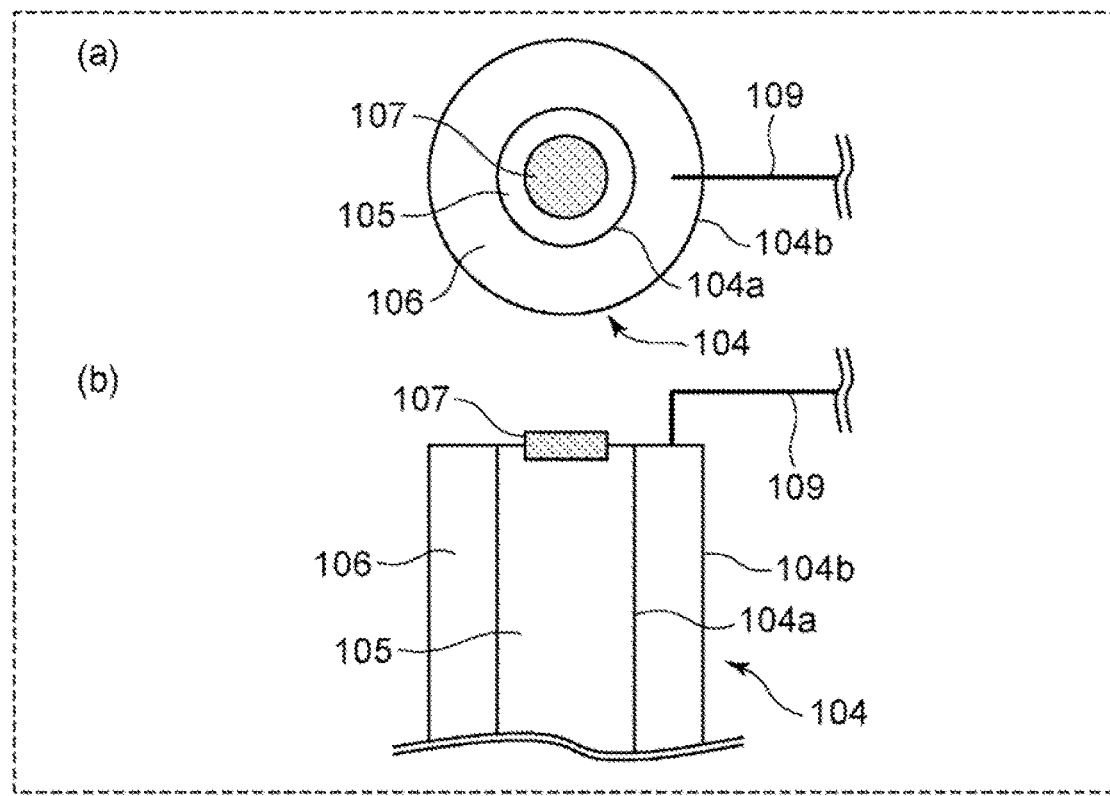
FIG. 5A illustrates a configuration of a compression pipe according to the exemplary embodiment of the disclosure.
Figure 5B:
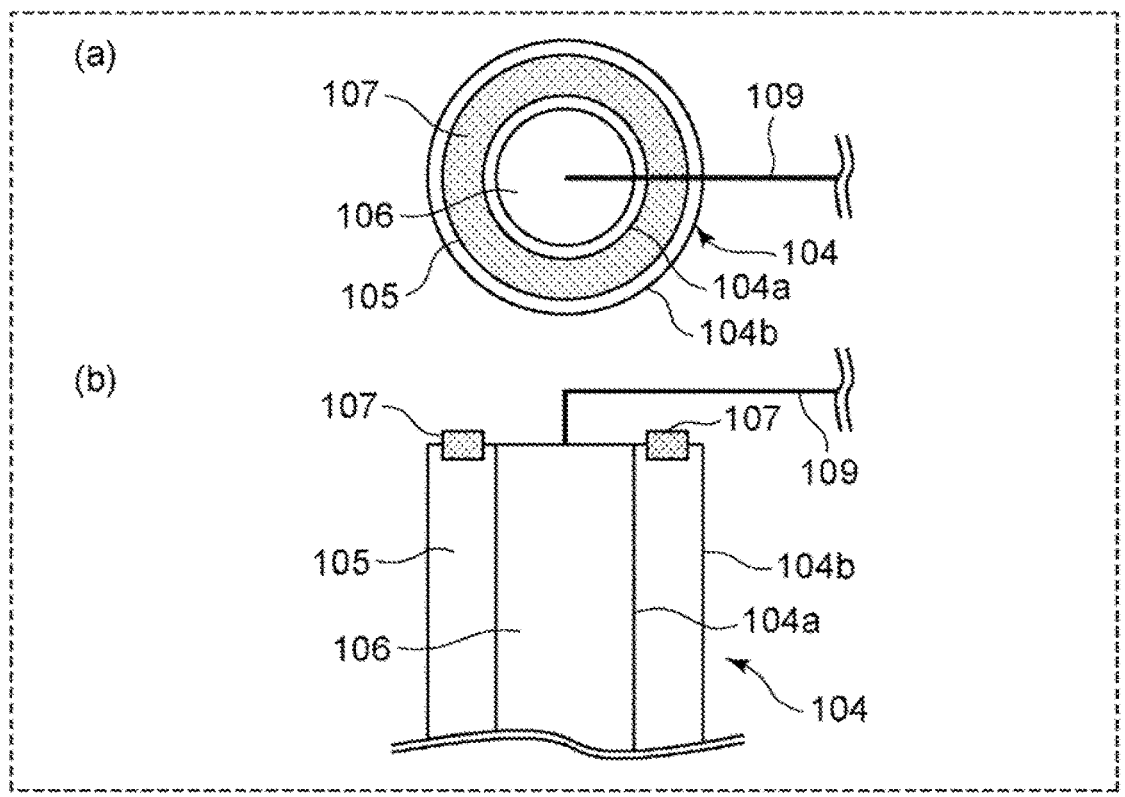
FIG. 5B illustrates a configuration of the compression pipe according to the exemplary embodiment of the present disclosure.
Figure 6:
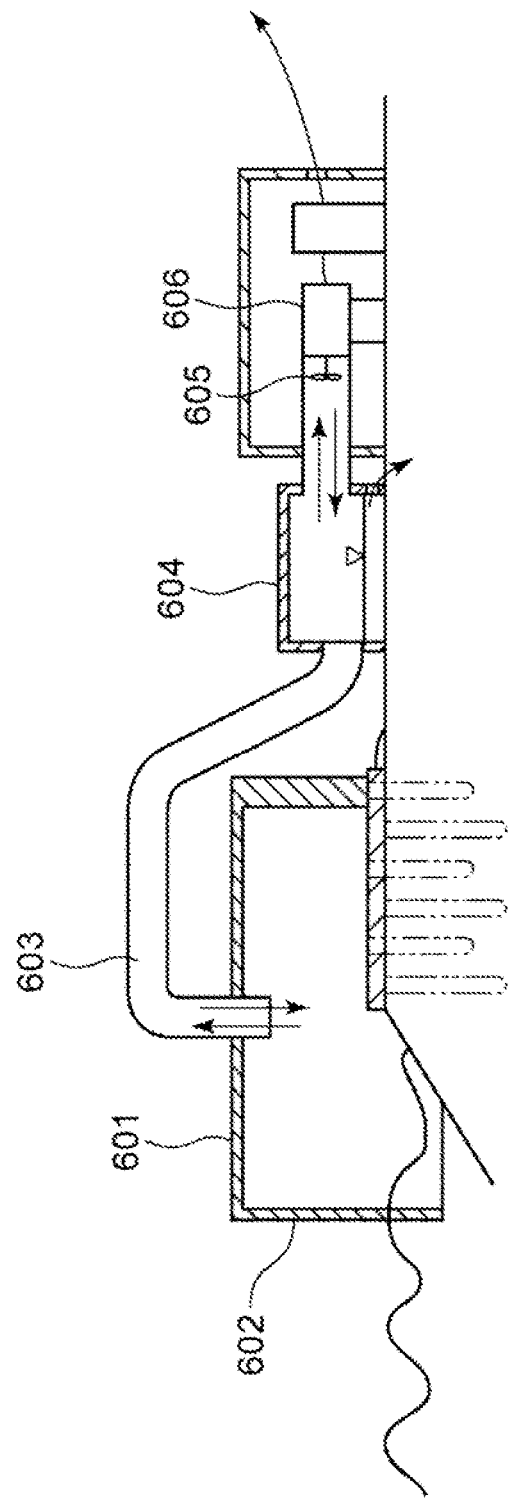
FIG. 6 illustrates a wave power utilization device of the related art described in Japanese Patent Unexamined Publication No. 2013-29087.

FIGS. 5A and 5B illustrate the configuration of compression pipe 104 of the wave power utilization device according to the exemplary embodiment of the disclosure. (a) of FIG. 5A illustrates a plan view of a configuration of the compression pipe according to the exemplary embodiment of the disclosure, and (b) illustrates a front sectional view of a configuration of the compression pipe according to the exemplary embodiment of the disclosure. (a) of FIG. 5B illustrates a plan view of a configuration of the compression pipe according to the exemplary embodiment of the disclosure, and (b) of FIG. 5B illustrates a front sectional view of a configuration of the compression pipe according to the exemplary embodiment of the disclosure.

Compression pipe 104 is formed of a double pipe having inner pipe 104a and outer pipe 104b, wave drawing section 105 is disposed on inner pipe 104a side of the double pipe in FIG. 5A, and air compressing section 106 is disposed on outer pipe 104b side. In FIG. 5B, air compressing section 106 is disposed on inner pipe 104a side of the double pipe of compression pipe 104, and wave drawing section 105 is disposed on outer pipe 104b side. The pipe wall of inner pipe 104a functions as wall 104c, and wave drawing section 105 and air compressing section 106 communicate with each other only on the lower side (for example, near the lower part or the lower part of the upper part) of compression pipe 104.

By disposing wave drawing section 105 on inner pipe 104a side of the double pipe as illustrated in FIG. 5A, gas-liquid introduction on-off valve 107 can be configured without becoming a complicated shape. As illustrated in FIG. 5B, by disposing air compressing section 106 on inner pipe 104a side of the double pipe, the pressure loss when seawater 202 flows into air compressing section 106 is reduced, and the compressed air can be efficiently obtained.

The arrangement of wave drawing section 105 and air compressing section 106 in the double pipe is selected depending on the wave conditions or the installation place.

Here, in the exemplary embodiment of the disclosure, wave drawing section 105 and air compressing section 106 are separated from each other by a pipe wall having a double pipe structure, but may be separated from each other by a wall such as a flat plate.

Compression pipe 104 is configured with wave drawing section 105 and air compressing section 106. However, by configuring the compression pipe with a length equal to or longer than the tide level difference due to the ebb and flow of the tide, it is not necessary to provide wave drawing section 105 and air compressing section 106 respectively, and by providing gas-liquid introduction on-off valve 107 at the upper part of the compression pipe, it is possible to generate compressed air without being affected by the ebb and flow of the tide.

However, by lengthening the compression pipe, the volume of air in the compression pipe becomes large, and the compression efficiency becomes low.

On the other hand, in the exemplary embodiment of the disclosure, the air in air compressing section 106 can be efficiently compressed without the compression efficiency becoming extremely low, regardless of whether the wave power utilization device is present on the sea surface or in the sea.

According to the above-described exemplary embodiment, when seawater 202 pushed by wave 201 enters wave receiving box 101, by opening gas-liquid introduction on-off valve 107, it is possible to prevent the rise of the internal pressure of wave receiving box 101 due to the rise of seawater surface 202b or 202c, and to sufficiently draw wave 201 into wave receiving box 101, and by closing gas-liquid introduction on-off valve 107 after sufficiently drawing wave 201 and contracting the air in compression pipe 104 that communicates with wave receiving box 101 by further drawing wave 201, it is possible to utilize the kinetic energy of wave 201 for the compression of the air. Accordingly, by utilizing the kinetic energy of wave 201, it is possible to generate high-pressure compressed air from the wave power compared to a case where the kinetic energy is not utilized, and store and utilize the generated compressed air.

By appropriately combining any of the various exemplary embodiments or modification examples among the various exemplary embodiments or modification examples, the effects of each can be achieved. It is possible to combine the exemplary embodiments with each other or the examples with each other, or the exemplary embodiments and the examples with each other, and also to combine the features in the different exemplary embodiments or the examples.

As described above, according to the wave power utilization device and the control method of a wave power utilization device according to an aspect of the disclosure, by utilizing the kinetic energy of the wave, it is possible to generate the high-pressure compressed air from the wave power compared to a case where the kinetic energy is not utilized, and to store and utilize the generated compressed air.

The wave power utilization device and the control method of a wave power utilization device according to the aspect of the disclosure can store the wave power as compressed air and utilize for power generation and the like with a simple configuration with a high compression efficiency, and the wave power can be applied as clean energy resources.

What is claimed is:

1. A wave power utilization device comprising:
a wave receiving box having a wave receiving box inlet that receives push and pull of waves of seawater, and having a space filled with the seawater that flows in from the wave receiving box inlet;
a hollow compression pipe connected to communicate with an inside of the wave receiving box, the hollow compression pipe having an upper opening and a lower opening which is set to have a wider flow path cross-sectional area than a flow path cross-sectional area of the upper opening, the hollow compression pipe including a tapered section, a wave drawing section, and an air compressing section, the tapered section connecting the lower opening and the upper opening to each other in a tapered shape, the wave drawing section drawing the waves drawn into the wave receiving box through the tapered section, the air compressing section compressing air by the drawn waves;
a gas-liquid introduction on-off valve which is connected to an upper part of the wave drawing section, and performs an opening operation to allow the air or the seawater to flow in and out;
an air discharge pipe connected to an upper part of the air compressing section and having a check valve that allows a flow of the air only in a downstream direction from the air compressing section;
a compressed air storage tank connected to a downstream side of a flow path of the air discharge pipe, and filled with the air compressed by the air compressing section;
an air introduction unit which introduces the air into the air compressing section;
an air introduction pipe which connects the air introduction unit and the air compressing section to each other; and
an air introduction on-off valve provided in a middle of the air introduction pipe and capable of introducing the air from the air introduction unit into the air compressing section during an opening operation.

2. The wave power utilization device of claim 1,
wherein the wave drawing section and the air compressing section are separated from each other by a wall and adjacent to each other in the hollow compression pipe, and
the wave drawing section and the air compressing section communicate with each other only on a lower side of the compression pipe.

3. The wave power utilization device of claim 1,
wherein the hollow compression pipe is formed of a double pipe having an inner pipe and an outer pipe,
one of the inner pipe and the outer pipe is the wave drawing section, and the other is the air compressing section,
the wave drawing section and the air compressing section are separated from each other by a pipe wall of the inner pipe and adjacent to each other, and
the wave drawing section and the air compressing section communicate with each other only on a lower side of the hollow compression pipe.

4. The wave power utilization device of claim 1,
wherein the gas-liquid introduction on-off valve has a valve body that performs opening and closing operations by a pressure of the air or the seawater drawn into the wave drawing section, and allows the air or the seawater to flow in and out during the opening operation of the valve body.

5. A control method of a wave power utilization device, the wave power utilization device including:
a wave receiving box having a wave receiving box inlet that receives push and pull of waves of seawater, and having a space filled with the seawater that flows in from the wave receiving box inlet, a hollow compression pipe connected to communicate with an inside of the wave receiving box, the hollow compression pipe having an upper opening and a lower opening which is set to have a wider flow path cross-sectional area than a flow path cross-sectional area of the upper opening, the hollow compression pipe including a tapered section, a wave drawing section, and an air compressing section, the tapered section connecting the lower opening and the upper opening to each other in a tapered shape, the wave drawing section drawing the waves drawn into the wave receiving box through the tapered section, the air compressing section compressing air by the drawn waves, a gas-liquid introduction on-off valve which is connected to an upper part of the wave drawing section, and performs an opening operation to allow the air or the seawater to flow in and out, an air discharge pipe connected to an upper part of the air compressing section and having a check valve that allows a flow of the air only in a downstream direction from the air compressing section, a compressed air storage tank connected to a downstream side of a flow path of the air discharge pipe, and filled with the air compressed by the air compressing section, an air introduction unit which introduces the air into the air compressing section, an air introduction pipe which connects the air introduction unit and the air compressing section to each other, and an air introduction on-off valve provided in a middle of the air introduction pipe and capable of introducing the air from the air introduction unit into the air compressing section during an opening operation, the method comprising:

sucking the air or the seawater from an outside of the compression pipe into an inside of the hollow compression pipe, from the gas-liquid introduction on-off valve during a receding wave, and flowing the waves having a speed into the wave receiving box during a pushing wave; and compressing the air by the air compressing section by closing the gas-liquid introduction on-off valve when the flowed-in waves push the air in the air compressing section.

6. The control method of a wave power utilization device of claim 5, wherein a pressure detection unit that detects a pressure in the air compressing section is installed in the air compressing section, and opening and closing of the gas-liquid introduction on-off valve and the air introduction on-off valve are controlled based on the pressure in the air compressing section detected by the pressure detection unit.

7. The control method of a wave power utilization device of claim 5, wherein a water level detection unit that detects a water level is installed in the air compressing section, and opening and closing of the gas-liquid introduction on-off valve and the air introduction on-off valve are controlled based on the water level detected by the water level detection unit.

* * * * *